United States Patent
Ramsay

(10) Patent No.: US 10,145,985 B2
(45) Date of Patent: Dec. 4, 2018

(54) STATIC EARTH MODEL CALIBRATION METHODS AND SYSTEMS USING PERMEABILITY TESTING

(71) Applicant: LANDMARK GRAPHICS CORPORATION, Houston, TX (US)

(72) Inventor: Travis St. George Ramsay, Rosenberg, TX (US)

(73) Assignee: LANDMARK GRAPHICS CORPORATION, Houston, TX (US)

( * ) Notice: Subject to any disclaimer, the term of this patent is extended or adjusted under 35 U.S.C. 154(b) by 177 days.

(21) Appl. No.: 14/909,963

(22) PCT Filed: Aug. 7, 2013

(86) PCT No.: PCT/US2013/054035
§ 371 (c)(1),
(2) Date: Feb. 3, 2016

(87) PCT Pub. No.: WO2015/020650
PCT Pub. Date: Feb. 12, 2015

(65) Prior Publication Data
US 2016/0178800 A1  Jun. 23, 2016

(51) Int. Cl.
*G01V 99/00* (2009.01)
*E21B 41/00* (2006.01)
*E21B 43/00* (2006.01)

(52) U.S. Cl.
CPC ............ *G01V 99/005* (2013.01); *E21B 41/00* (2013.01); *E21B 43/00* (2013.01)

(58) Field of Classification Search
CPC .. E21B 43/26; E21B 43/267; E21B 2049/085; G01V 99/005; G01V 11/00
USPC .................... 703/2, 10; 702/6, 14
See application file for complete search history.

(56) References Cited

U.S. PATENT DOCUMENTS

| | | | |
|---|---|---|---|
| 8,165,817 B2 | 4/2012 | Betancourt et al. | |
| 2008/0091396 A1* | 4/2008 | Kennon | E21B 43/26 703/10 |
| 2008/0319726 A1* | 12/2008 | Berge | E21B 41/0064 703/10 |
| 2009/0276156 A1* | 11/2009 | Kragas | E21B 43/12 702/6 |

(Continued)

FOREIGN PATENT DOCUMENTS

WO    2015/020650    2/2012

OTHER PUBLICATIONS

"Australian Application Serial No. 2013397497; First Examination Report dated Oct. 4, 2016.", 3 pages.

(Continued)

*Primary Examiner* — Jonathan Han
(74) *Attorney, Agent, or Firm* — Gilliam IP PLLC

(57) ABSTRACT

At least some of the disclosed systems and methods obtain a static earth model having multiple layers. Further, at least some of the disclosed systems and methods test a permeability associated with at least part of the static earth model. Further, at least some of the disclosed systems and methods calibrate the static earth model by adjusting a distribution or proportion of geological features in at least one of the multiple layers based on the testing. Further, at least some of the disclosed systems and methods use the calibrated static earth model to predict fluid flow in a formation.

20 Claims, 6 Drawing Sheets

(56) References Cited

U.S. PATENT DOCUMENTS

| 2011/0108271 | A1* | 5/2011 | Hinkel | C09K 8/584 166/270.1 |
|---|---|---|---|---|
| 2011/0246143 | A1* | 10/2011 | Pomerantz | E21B 49/00 703/2 |
| 2012/0158378 | A1* | 6/2012 | Enchery | E21B 43/00 703/2 |
| 2012/0185225 | A1 | 7/2012 | Onda et al. | |
| 2012/0221306 | A1* | 8/2012 | Hurley | G01V 99/005 703/6 |
| 2013/0096900 | A1* | 4/2013 | Usadi | G06F 17/5018 703/10 |

OTHER PUBLICATIONS

"Canadian Application Serial No. 2,919,860, Office Action dated Mar. 13, 2017.", 4 pages.

PCT International Search Report and Written Opinion, dated Feb. 14, 2014, Appl No. PCT/US2013/54035, "Static Earth Model Calibration Methods and Systems Using Permeability Testing," filed Aug. 7, 2013, 13 pgs.

Holden, L., et al., "Use of Well Test Data in Stochastic Reservoir Modelling," SPE 30591, SPE Annual Technical Conference & Exhibition held in Dallas, USA., Oct. 22-25, 1995, 7 pgs.

GB Application Serial No. 1601335.1; UKIPO Examination Report; dated Feb. 21, 2018, 3 Pages.

United Kingdom Application Serial No. 1601335.1; UKIPO Examination Report; dated Mar. 28, 2018.

Canadian Requisition by the Examiner; Application Serial No. 2919860; Jan. 15, 2018, 4 pages.

\* cited by examiner

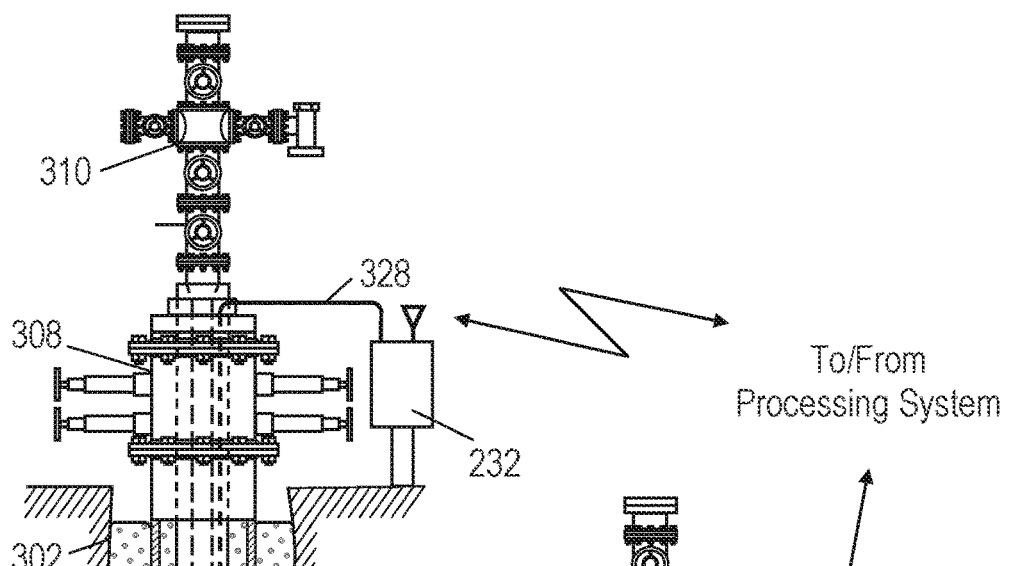
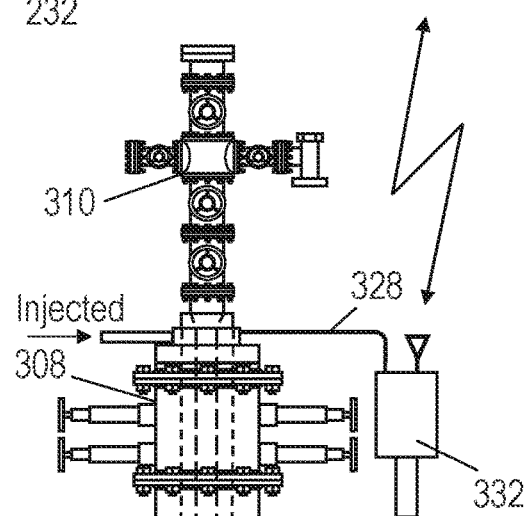
FIG. 4A
FIG. 4B

STATIC EARTH MODEL CALIBRATION METHODS AND SYSTEMS USING PERMEABILITY TESTING

BACKGROUND

Modern oil field operators demand a great quantity of information relating to the parameters and conditions encountered downhole. Among the types of information most sought is permeability, i.e., the ability of a fluid (usually oil, water, gas, etc.) to flow through a geologic formation. The permeability of a reservoir is a function of the interconnectedness of the available pore space, as well as, pore size distribution, flow direction, grain size and sorting, shale content, non-connecting vugs, and fractures. Permeability estimates play an important role in overall reservoir management and development (e.g., economic feasibility determinations, reserve estimates, well spacing, reservoir characterizations, simulations, completion designs, and secondary recovery projects). Likewise, models for simulating reservoir behavior (e.g., static earth models and dynamic reservoir models) play an important role.

BRIEF DESCRIPTION OF THE DRAWINGS

A better understanding of the various disclosed embodiments can be obtained when the following detailed description is considered in conjunction with the attached drawings, in which:

FIGS. 4A-4C shows illustrative production wells and a computer system to control data collection and production.

It should be understood that the drawings and detailed description are not intended to limit the disclosed embodiments to the particular forms shown, but on the contrary, the intention is to cover all modifications, equivalents and alternatives falling within the scope of the appended claims.

DETAILED DESCRIPTION

Hydrocarbon production monitoring or planning involves the collection of measured data from within and around the wells of a reservoir. Such data may include, but is not limited to, water saturation, water and oil cuts, fluid pressure and fluid flow rates. As the data is collected, it is archived into a historical database. The collected data, however, mostly reflects conditions immediately around the reservoir wells. To provide a more complete picture of the state of a reservoir, simulations are executed that model the overall behavior of the entire reservoir based on the collected data, both current and historical. These simulations predict the reservoir's overall current state, producing simulated data values both near and at a distance from the wellbores.

The accuracy of reservoir simulation results is limited by the static earth model depicting the subsurface formation as well as various other inputs including: rock-fluid descriptions, and pressure-volume-temperature characterizations.

In accordance with at least some embodiments, disclosed methods and systems determine a static earth model using a permeability-based calibration. For example, static earth model determination may include the steps: obtaining a static earth model having multiple layers; testing a permeability associated with at least part of the static earth model; and calibrating depositional facies attributes of the static earth model (e.g., adjusting a distribution or proportion of at least one of multiple depositional facies types) based on the permeability test results. Additional permeability testing and calibration may be applied to a static earth model until permeability test results are accurate to within a tolerance threshold.

Figure 1:
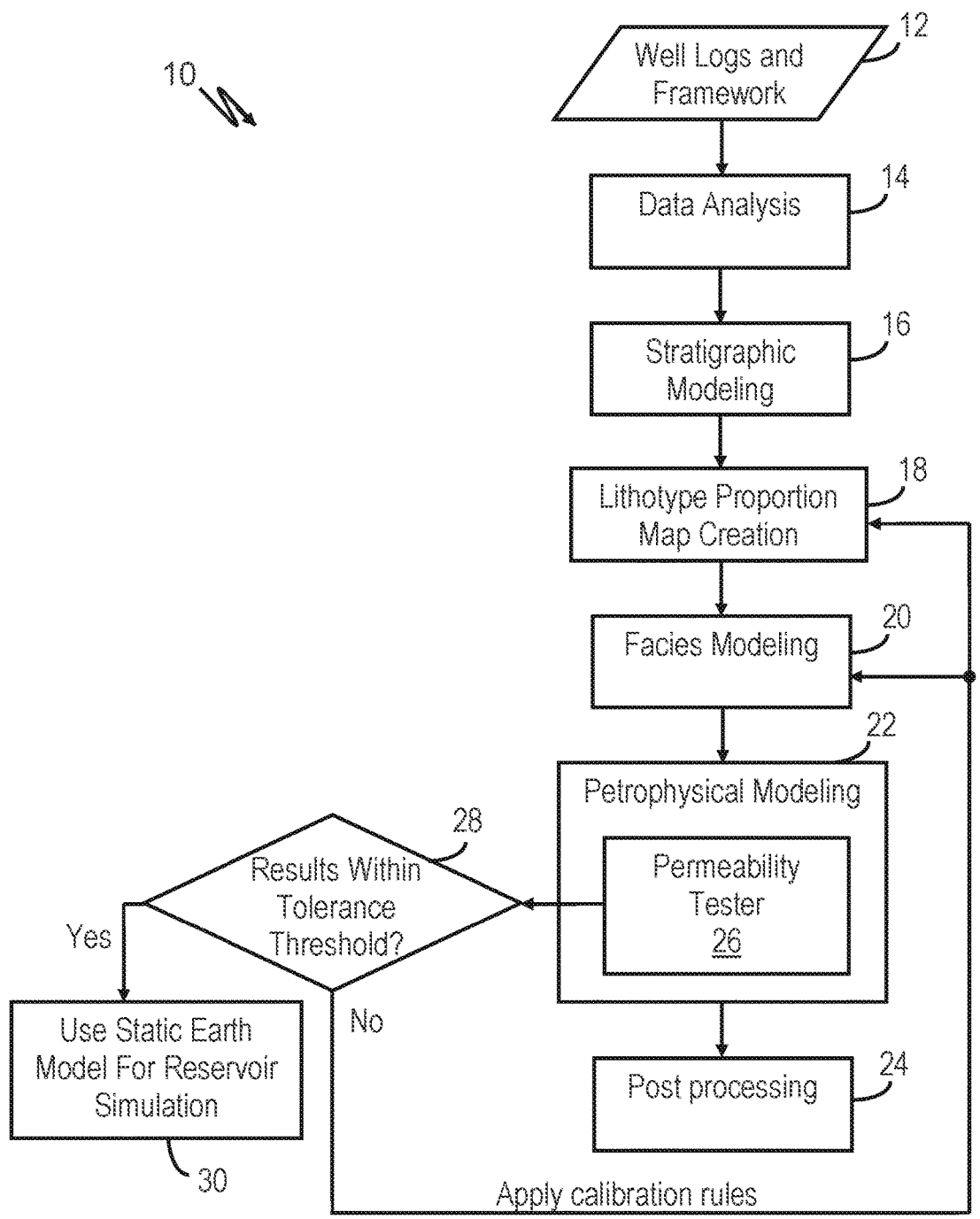
FIG. 1 shows an illustrative process for determining a static earth model.

FIG. 1 shows an illustrative process 10 for determining a static earth model. The process includes a data analysis block 14 that receives well log input from block 12. The well logs correspond to collected data that may include, but is not limited to, porosity, permeability, resistivity, and gamma ray. Here data quality is assessed and outliers are removed such that spurious data is not introduced into the developed model. Block 12 also provides a framework, which corresponds to structural rules for a static earth model based on framework interpretation and knowledge of the depositional environment. The stratigraphic modeling block 16 uses the framework to build a geocellular grid that honors the internal bedding geometries resulting from sedimentation.

At lithotype proportion map creation block 18, a lithotype proportion map that defines grouped proportion curves and/or smoothed lithotype proportions is generated. The generated lithotype proportion map is provided to a facies modeling block 20 that generates one or more depositional facies models (e.g., based on stochastic simulation methods), which may be used as a template for the mathematical distribution of petrophysical properties within a reservoir or formation. For example, in process 10, the one or more facies models are input to a petrophysical modeling block 22, which mathematically distributes petrophysical properties s within a static earth model using spatial constraints of the one or more facies models.

In at least some embodiments, the petrophysical features are input to a post processing block 24 that estimates volumetric characteristic such as stock tank original oil in place, gross rock volume, and recoverable hydrocarbon. The post processing block 24 also may quantify static property uncertainty characteristics and may execute a single-phase fluid numerical simulation in the static earth model in order to assess the effect of the distributed petrophysical properties and the spatial constraints resulting from the depositional facies.

In process 10, the petrophysical modeling block 22 includes a permeability tester block 26 that tests the accuracy of the static earth model's permeability. As an example, the permeability tester block 26 may assess the accuracy of the static earth model's permeability is by comparing results of a flow simulation that relies on the static earth model with real-world flow measurements. In at least some embodiments, the permeability tester block 26 compares the permeability related to simulated fluid flow with an absolute formation permeability estimate computed using Darcy's law expressed as:

$$K_{abs} = \frac{q\mu}{A\nabla P},$$

where $K_{abs}$ is an absolute permeability, q is a flux, µ is a fluid viscosity, A is a cross-sectional area, and $\nabla P$ is a pressure gradient. For example, $K_{abs}$ may be computed analogously between an injector well and producer well using predetermined values for pressure drop between the wells ($\nabla P$), flow rates of fluid entering a surface area of the grid cell in which an injector well is perforated and fluid flux entering a surface area of the grid cell in which a producer well is perforated (q), fluid viscosity of fluid exiting the injector well and of fluid entering the producer well (µ), and cumulative cellular surface area (A).

In at least some embodiments, the absolute permeability value is based on well test measurements collected from wells in a reservoir. The measurements should be of sufficient duration that reservoir behavior and boundary effects may be determined. This will be different for each reservoir depending on shape, volume, intra/inter connected rock-type assemblages, and associated production rates.

Such well tests are performed by creating a step change in flow rate. For example, the flow rate may be changed by: closing a flowing well or an injection well (buildup or falloff, respectively); opening a well previously shut in (drawdown); or injecting in a well previously closed (injection). This rate change creates a change in pressure in the same well (exploration or production testing) or in a different well (e.g., interference) testing. In layered reservoirs, there is also a change in the rates from each individual layer, which can be measured with a production logging tool (PLT).

Further, a change in rate can be created at the surface by shutting or opening the master valve at the bottom of the well with a special downhole shut-in device. Wellhead shut-in is commonly used in wells already in production, whereas bottomhole shut-in is standard practice after drilling (a drillstem test (DST)). The way the rate signal is created is not important as far as well test analysis is concerned. The same interpretation methods are used for production tests, DSTs, analysis of wireline formation tests, and for testing while drilling. What is important for analysis is the quality of the rate input signal, which should be of the proper shape and duration, and the quality of the measured pressure output signal.

Although real-world reservoir measurements would be of highest value to an operator, static earth model permeability testing and calibrations could be based on "what-if" scenarios or data. Further, additional value could come from using repeated well tests to detect changes in petrophysical properties attributed to fluid trapping or geomechanical effects in the reservoir as a result of production. In this manner, a static earth model could be updated without a geomechanics model.

In addition to the verification of the simulated permeability with respect to the permeability determined from well test analysis, the static earth model may undergo a history matching process. In this history matching process, the production rates and cumulative produced fluids are simulated using the static earth model 122 as input and are compared with historical production data from the field (e.g., historical data from wells in production within the reservoir and/or individual wells corresponding to the field). The underlying petrophysical properties of the static earth model 122 may then be updated/adjusted in order to obtain a match of simulated results with respect to measured historical data. The need to make adjustments to the petrophysical properties during the history matching process would become diminished as static earth model updates are made (considering the geologic characterization of measured data in the formation as opposed to produced volumes of fluid).

At block 28, a determination is made regarding whether permeability test results are within a threshold tolerance. In other words, an assessment is made regarding whether the permeability computed for the static earth model matches with permeability results measured in the field (historical or current). If the permeabilities match to within a threshold tolerance, the static earth model is applied to ongoing operations (e.g., fluid flow simulations for a reservoir) at block 30. Otherwise, the process 10 returns to facies modeling block 20, where the depositional facies are updated based on the results of the permeability tester block 26. To update the depositional facies, calibration rules and/or a calibration interface are applied. The calibration rules, for example, may establish the level and type of adjustments that are made to the depositional facies. Meanwhile, the calibration interface provides a user interface that enables a user to adjust static earth model features using menu options, tables, select/drag options, etc. Example calibration rules include increasing the amount of permeable facies (sand, highly porous siltstone) when permeability in the static earth model is below the real-world measurement. Alternatively, the amount of permeable facies may be decreased when permeability in the static earth model is above the real-world measurement. Additionally or alternatively, the amount of non-permeable (shale, pyrite, halite) facies could be increased or decreased using calibration rules and/or a calibration interface. In some cases, a combination of adjusting permeable and non-permeable facies may be necessary. The process of calibrating and testing a static earth model may continue until the accuracy of its permeability is determined to be within a threshold tolerance level.

Figure 2:
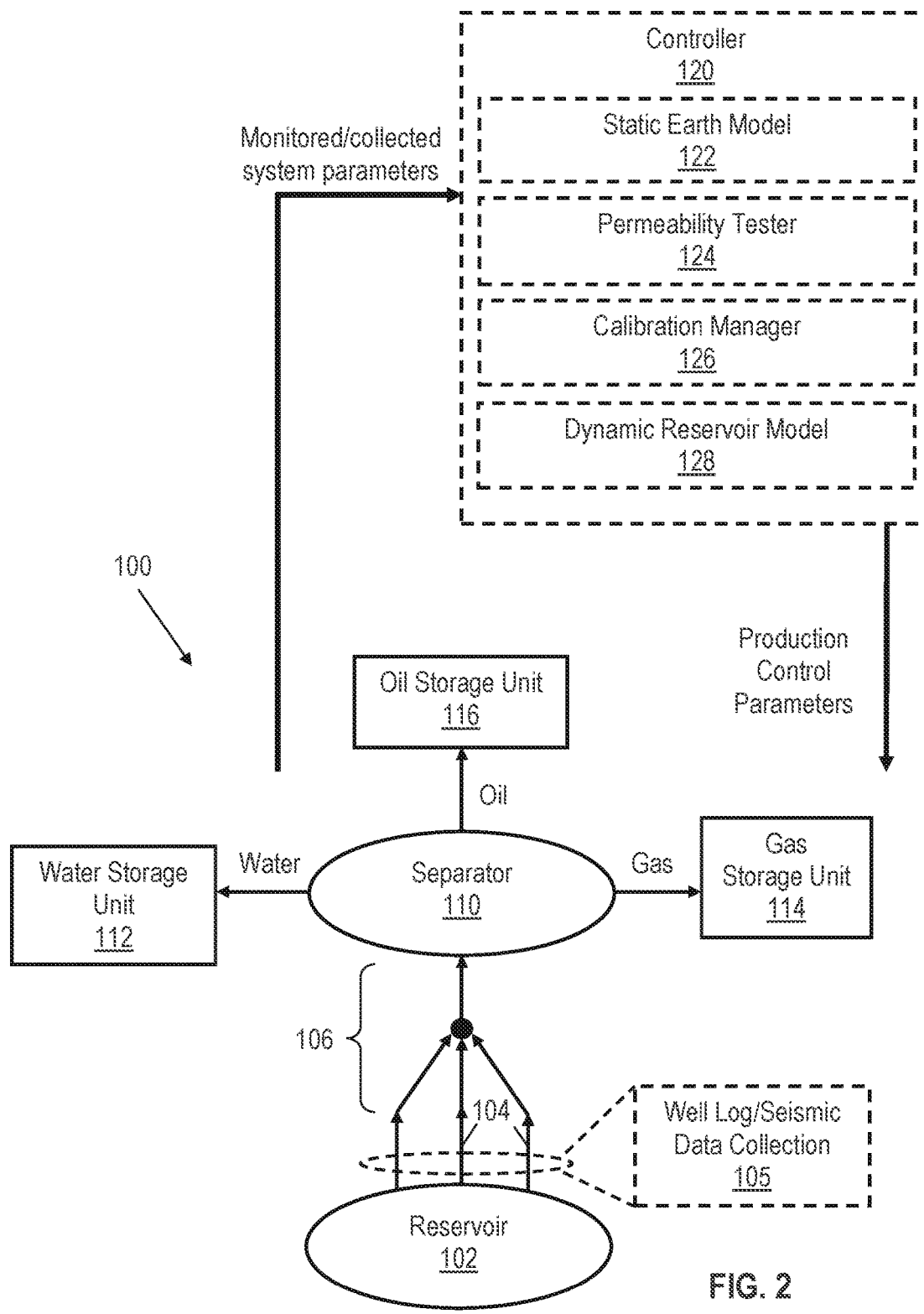
FIG. 2 shows an illustrative hydrocarbon production system.

FIG. 2 shows an illustrative hydrocarbon production system 100. The illustrated hydrocarbon production system 100 includes a plurality of wells 104 extending from a reservoir 102, where the arrows representing the wells 104 show the direction of fluid flow (i.e., wells 104 represent production wells). Although only production wells are shown, hydrocarbon production system 100 could also include injector wells. Further, the hydrocarbon production system 100 also includes well log and seismic data collection 105 at wells 104.

In FIG. 2, a surface network 106 transports fluid from the wells 104 to a separator 110, which directs water, oil, and gas to separate storage units 112, 114, and 116. The water storage unit 112 may direct collected water back to reservoir 102 or elsewhere. The gas storage unit 114 may direct collected gas back to reservoir 102, to a gas lift interface 118, or elsewhere. The oil storage unit 116 may direct collected oil to one or more refineries. In different embodiments, the separator 110 and storage units 112, 114, and 116 may be part of a single facility or part of multiple facilities associated with the hydrocarbon production system model 100. Although only one oil storage unit 116 is shown, it should be understood that multiple oil storage units may be used in the hydrocarbon production system 100. Similarly, multiple water storage units and/or multiple gas storage units may be used in the hydrocarbon production system 100.

In FIG. 2, the hydrocarbon production system 100 includes a controller 120 with various components related to the disclosed methods and systems. The controller 120 represents, for example, one or more computers executing software or other instructions. As shown, the controller 120 receives monitored system parameters from various components of the hydrocarbon production system 100, and determines various production control parameters for the hydrocarbon production system 100. It should be understood that some operations of the controller 120 may be automated, while others involve operator input and/or the accumulation of data or simulation results over time. Further, some operations of controller 120 may be based on a combination of software-based analysis and operator input over a long period of time. Rather than provide information on all the possible control operations of hydrocarbon production system 100, the discussion of controller 120 is limited to its use of various components related to the static earth model calibration techniques described herein. One of ordinary skill in the art would understand that the controller 120 may also perform various other operations in real-time and/or in a time-segmented manner.

In accordance with at least some embodiments, the controller 120 includes a static earth model 122 determined using the process 10 discussed in FIG. 1. The static earth model 122 includes stratigraphic, facies, and petrophysical features as described herein. As shown, the controller 120 also includes a permeability tester 124 that tests the accuracy of permeability for the static earth model 122. The controller 120 also includes calibration manager 126 that enable updates to the static earth model 122 based on the test results of the permeability tester 124, calibration rules, and/or a calibration interface.

In at least some embodiments, the permeability tester 124 assesses an accuracy of the permeability for the static earth model 122 by computing an absolute formation permeability using Darcy's law. In some embodiments, the location of the computed absolute formation permeability corresponds to the space between a well pair, where a well test is performed. Further, in some embodiments, the absolute formation permeability may be based on multiple well tests, where the location of the computed absolute formation permeability corresponds to the space between different well pairs. The computed formation permeability is compared with the permeability related to fluid flow simulation results that rely on the static earth model 122.

In at least some embodiments, the permeability tester 124 simulates fluid flow using dynamic reservoir model 128. Further, the permeability tester 124 may employ a fully implicit method (FIM) that simulates fluid flow using Newton's method to solve a non-linear system of equations. Other methods of modeling reservoir simulation (e.g., the IMPES only method) are also contemplated herein.

If the computed formation permeability and the simulation-based permeability match to within a threshold tolerance, calibration of the static earth model 122 is not needed. On the other hand, if these permeabilities do not match to within the threshold tolerance, the static earth model 122 is calibrated using calibration manager 126. The process of testing and calibrating the static earth model 122 employed by the controller 120 may continue until the accuracy of the static earth model 122 is determined to be within a threshold tolerance level.

Figure 3:
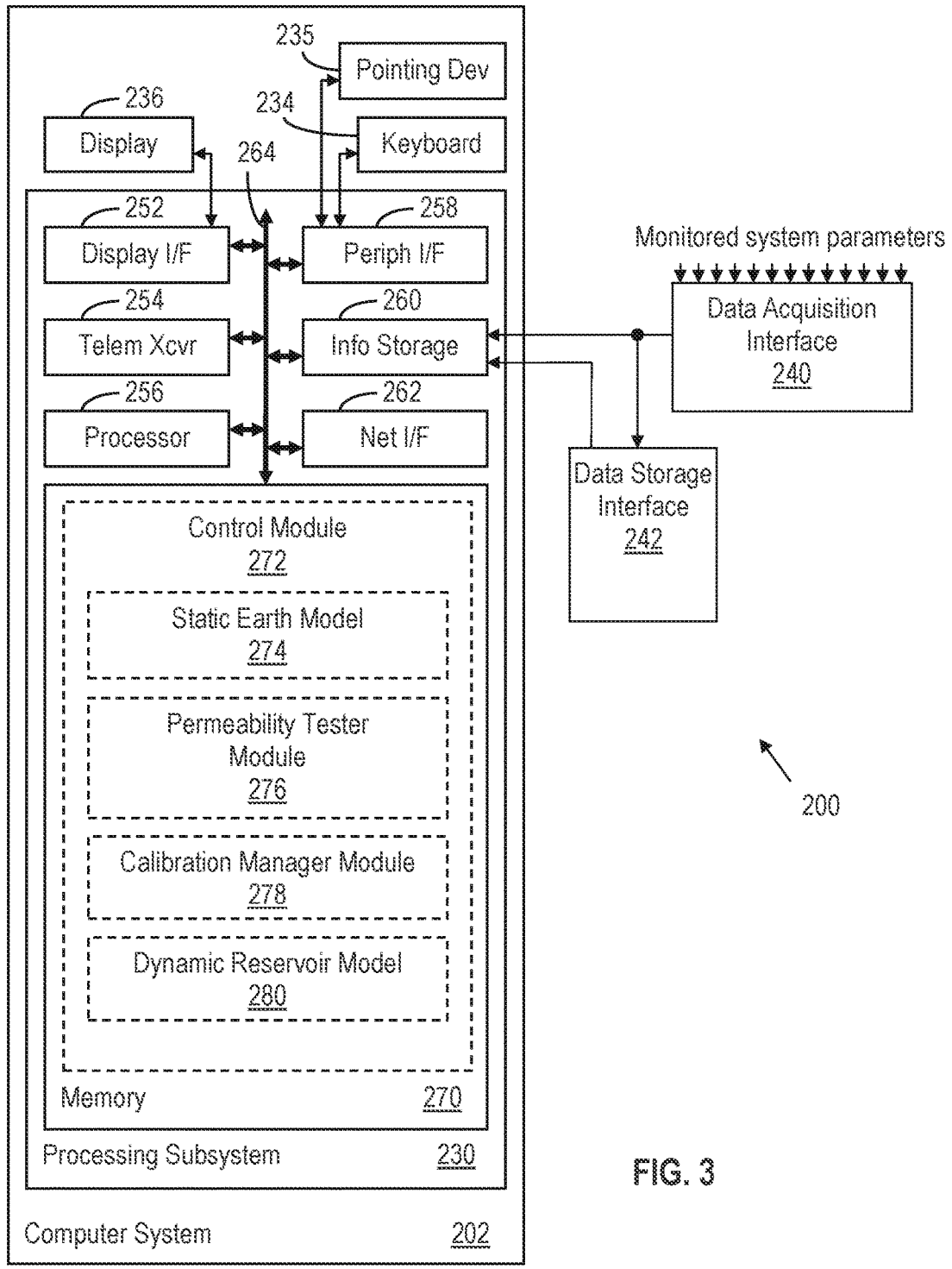
FIG. 3 shows illustrative components for a control system.

FIG. 3 shows illustrative components for a control system 200 that carries out the operations of controller 120. The illustrated components include a computer system 202 coupled to a data acquisition interface 240 and a data storage interface 242. In at least some embodiments, a user is able to interact with computer system 202 via keyboard 234 and pointing device 235 (e.g., a mouse) to perform the static earth model determination, calibration, and use operations described herein.

As shown, the computer system 202 comprises includes a processing subsystem 230 with a display interface 252, a telemetry transceiver 254, a processor 256, a peripheral interface 258, an information storage device 260, a network interface 262 and a memory 270. Bus 264 couples each of these elements to each other and transports their communications. In some embodiments, telemetry transceiver 254 enables the processing subsystem 230 to communicate with downhole and/or surface devices (either directly or indirectly), and network interface 262 enables communications with other systems (e.g., a central data processing facility via the Internet). In accordance with embodiments, user input received via pointing device 235, keyboard 234, and/or peripheral interface 258 are utilized by processor 256 to perform the static earth model determination, calibration, and use operations described herein. Further, instructions/data from memory 270, information storage device 260, and/or data storage interface 242 are utilized by processor 256 to perform static earth model determination operations, permeability testing operations, and calibration operations described herein.

As shown, the memory 270 comprises a control module 272 that enables computer system 202 to perform the disclosed operations. More specifically, the control module 272 includes a static earth model 274 obtained using, for example, process 10 of FIG. 1. The control module 272 also includes permeability tester module 276 to perform the operations described for permeability tester block 26 and/or permeability tester 124. Further, the control module includes calibration manager module 278 that employs calibration rules and/or a calibration interface as described herein. Further, the control module 272 includes a dynamic reservoir model 280 employed by the permeability tester module 276 to perform fluid flow simulations as described herein.

The various software modules stored by memory 270 cause processor 256 to perform static earth model determination operations, permeability testing operations, and static earth model calibration operations as described herein. In at least some embodiments, the control module 272, when executed, causes the computer system 202 to perform various steps including: obtaining a static earth model having facies features; performing a permeability test for at least part of the static earth model by applying Darcy's law to an area between an injector well and a production well; and calibrating the static earth model by adjusting the facies features (e.g., distribution and/or proportions) based on the permeability test. In at least some embodiments, the calibrated static earth model may subsequently be used to predict fluid flow in a formation without further calibration. Additionally, periodic calibrations for the static earth model may be performed using permeability measurements collected from well tests or other operations.

More specifically, in some embodiments, the control module 272, when executed, causes the computer system 202 to perform a fluid flow simulation, to compare results of the fluid flow simulation with the computed formation permeability, and to adjust facies features of the static earth model based on the comparison. Further, the control module 272, when executed, may cause the computer system 202 to generate a facies model, where a lithotype proportion map is applied to accurately calibrate facies proportions, and to constrain the distribution of petrophysical properties of the static earth model such that the petrophysical properties are spatially constrained by the facies features. Further, the control module 272, when executed, may cause the computer system 202 to repeat the process of testing a permeability and calibrating a static earth model until fluid flow simulation results predicted using the static earth model correlates with formation permeability results of a well test to within a predetermined tolerance level. Although the various modules 272, 274, 276, and 278 are described as software modules executable by a processor (e.g., processor 256), it should be understood that comparable operations may be performed by programmable hardware modules, application-specific integrated circuits (ASICs), or other hardware.

Figure 4C:
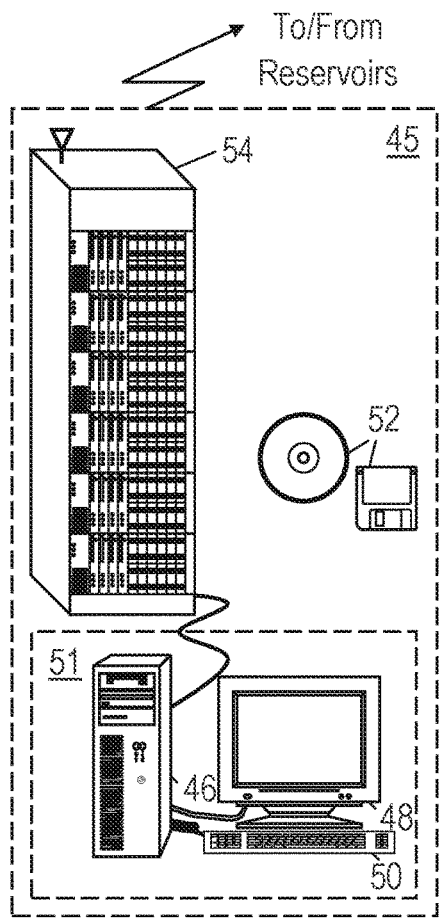

The disclosed static earth model determination and calibration operations may be combined with other production system management operations, where expense and time management efforts are needed. The systems and methods described herein rely in part on measured data collected from production system components such as fluid storage units, surface network components, and wells, such as those found in hydrocarbon production fields. Such fields generally include multiple producer wells that provide access to the reservoir fluids underground. Further, controllable production system components and/or EOR components are generally implemented at each well to throttle up or down the production as needed based on predetermined control criterion. FIGS. 4A-4C show example production wells and a computer system to control data collection and production.

More specifically, FIG. 4A shows an example of a producer well with a borehole 302 that has been drilled into the earth. Such boreholes are routinely drilled to ten thousand feet or more in depth and can be steered horizontally for perhaps twice that distance. The producer well also includes a casing header 304 and casing 306, both secured into place by cement 303. Blowout preventer (BOP) 308 couples to the casing header 304 and to production wellhead 310, which together seal in the well head and enable fluids to be extracted from the well in a safe and controlled manner.

Measured well data is periodically sampled and collected from the producer well and combined with measurements from other wells within a reservoir, enabling the overall state of the reservoir to be monitored and assessed. These measurements may be taken using a number of different downhole and surface instruments, including but not limited to, temperature and pressure sensor 318 and flow meter 320. Additional devices also coupled in-line to production tubing 312 include downhole choke 316 (used to vary the fluid flow restriction), electric submersible pump (ESP) 322 (which draws in fluid flowing from perforations 325 outside ESP 322 and production tubing 312), ESP motor 324 (to drive ESP 322), and packer 314 (isolating the production zone below the packer from the rest of the well). Additional surface measurement devices may be used to measure, for example, the tubing head pressure and the electrical power consumption of ESP motor 324. In the other illustrative producer well embodiment shown in FIG. 4B, a gas lift injector mandrel 326 is coupled in-line with production tubing 312 that controls injected gas flowing into the production tubing at the surface. Although not shown, the gas lift producer well of FIG. 4B may also include the same type of downhole and surface instruments to provide the above-described measurements.

Each of the devices along production tubing 312 couples to cable 328, which is attached to the exterior of production tubing 312 and is run to the surface through blowout preventer 308 where it couples to control panel 332. Cable 328 provides power to the devices to which it couples, and further provides signal paths (electrical, optical, etc.) that enable control signals to be directed from the surface to the downhole devices, and for telemetry signals to be received at the surface from the downhole devices. The devices may be controlled and monitored locally by field personnel using a user interface built into control panel 332, or may be controlled and monitored by a remote computer system, such as the computer system 200 of FIG. 3 or the computer system 45 of FIG. 4C. Communication between control panel 332 and the remote computer system may be via a wireless network (e.g., a cellular network), via a cabled network (e.g., a cabled connection to the Internet), or a combination of wireless and cabled networks.

For both of the producer well embodiments of FIGS. 4A and 4B, control panel 332 includes a remote terminal unit (RTU) which collects the data from the downhole measurement devices and forwards it to a supervisory control and data acquisition (SCADA) system that is part of a processing system such as computer system 45 of FIG. 4C. In the illustrative embodiment shown, computer system 45 includes a blade server-based computer system 54 that includes several processor blades, at least some of which provide the above-described SCADA functionality. Other processor blades may be used to implement the disclosed simulation solution systems and methods. Computer system 45 also includes user workstation 51, which includes a general purpose processor 46. Both the processor blades of blade server 54 and general purpose processor 46 are preferably configured by software, shown in FIG. 4C in the form of removable, non-transitory (i.e., non-volatile) information storage media 52, to process collected well data within the reservoirs and data from a gathering network (described below) that couples to each well and transfers product extracted from the reservoirs. The software may also include downloadable software accessed through a communication network (e.g., via the Internet). General purpose processor 46 couples to a display device 48 and a user-input device 50 to enable a human operator to interact with the system software 52. Alternatively, display device 48 and user-input device 50 may couple to a processing blade within blade server 54 that operates as general purpose processor 46 of user workstation 51.

In at least some illustrative embodiments, additional well data is collected using a production logging tool, which may be lowered by cable into production tubing 312. In other illustrative embodiments, production tubing 312 is first removed, and the production logging tool is then lowered into casing 306. In other alternative embodiments, an alternative technique that is sometimes used is logging with coil tubing, in which production logging tool couples to the end of coil tubing pulled from a reel and pushed downhole by a tubing injector positioned at the top of production wellhead 310. As before, the tool may be pushed down either production tubing 312 or casing 306 after production tubing 312 has been removed. Regardless of the technique used to introduce and remove it, the production logging tool provides additional data that can be used to supplement data collected from the production tubing and casing measurement devices. The production logging tool data may be communicated to computer system 45 during the logging process, or alternatively may be downloaded from the production logging tool after the tool assembly is retrieved.

Figure 5:
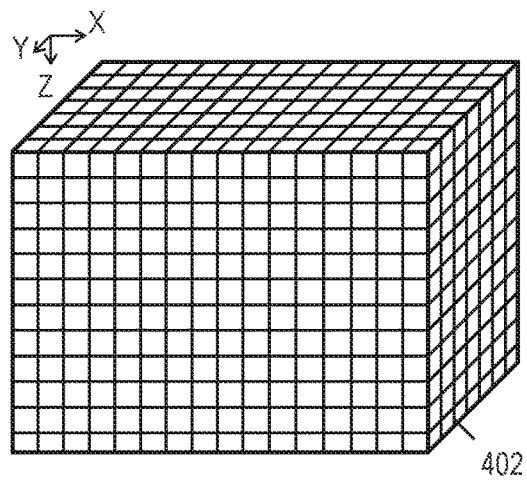
FIG. 5 shows an illustrative data volume in three dimensions.

The static earth model determination, permeability testing, and calibration techniques described herein can be related to a three dimensional array of data values. Such data values may correspond to collected survey data, test data, simulation data, and/or other values. Collected survey data, test data, and/or simulation data is of little use when maintained in a raw data format. Hence collected data, test data, and/or simulation data is sometimes processed to create a data volume, i.e., a three dimensional array of data values such as the data volume 402 of FIG. 5. The data volume 402 represents a distribution of formation characteristics throughout the survey region. The three-dimensional array comprises uniformly-sized cells, each cell having data values representing one or more formation characteristics for that cell. Examples of suitable formation characteristics include porosity, permeability, and density. Further, statigraphic features, facies features, and petrophysical features may be applied to the three-dimensional array to represent a static earth model as described herein. The volumetric data format readily lends itself to computational analysis and visual rendering, and for this reason, the data volume 402 may be termed a "three-dimensional image" of the survey region.

Figure 6:
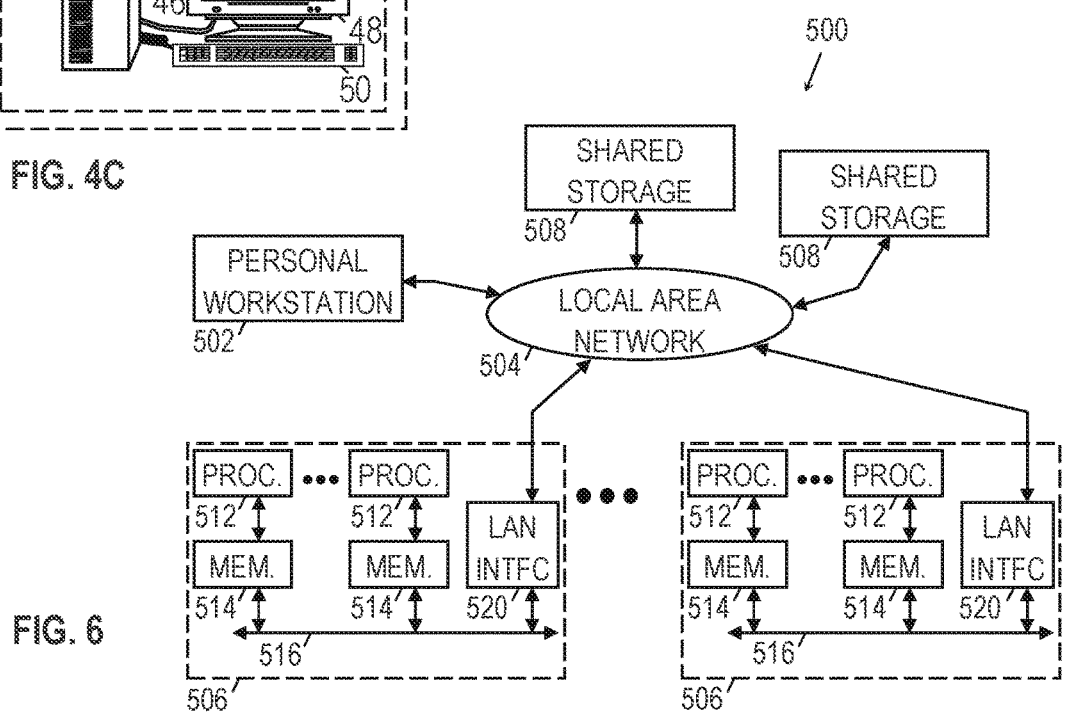
FIG. 6 shows an illustrative imaging system.

FIG. 6 shows an illustrative imaging system for displaying a static earth model, permeability test results, simulations results, or related data. In FIG. 6, a personal workstation 502 is coupled via a local area network (LAN) 504 to one or more multi-processor computers 506, which are in turn coupled via the LAN to one or more shared storage units 508. Personal workstation 502 serves as a user interface to the processing system, enabling a user to load survey data, static earth model data, test data, and/or simulation data into the system, to retrieve and view image data from the system, and to configure and monitor the operation of the processing system. Personal workstation 502 may take the form of a desktop computer with a graphical display that graphically shows survey data, static earth model data, test data, and/or simulation data and images of a corresponding region. Personal workstation 502 also may include input devices (e.g., a keyboard and mouse) that enable the user to move files, execute processing software, select/input options or commands.

LAN 504 provides high-speed communication between multi-processor computers 506 and with personal workstation 502. The LAN 504 may take the form of an Ethernet network. Meanwhile, multi-processor computer(s) 506 provide parallel processing capability to enable suitably prompt conversion of static earth model data, raw data signals, test data, and/or simulation data into a region image. Each computer 506 includes multiple processors 512, distributed memory 514, an internal bus 516, and a LAN interface 520. Each processor 512 operates on an allocated portion of the input data to produce a partial image of a corresponding region. Associated with each processor 512 is a distributed memory module 514 that stores conversion software and a working data set for the processor's use. Internal bus 516 provides inter-processor communication and communication to the LAN networks via interface 520. Communication between processors in different computers 506 can be provided by LAN 504.

Shared storage units 508 may be large, stand-alone information storage units that employ magnetic disk media for nonvolatile data storage. To improve data access speed and reliability, the shared storage units 508 may be configured as a redundant disk array. Shared storage units 508 initially store a data volume such as data volume 402. The matrix values and/or image volumes can be stored on shared storage units 508 for later processing. In response to a request from the workstation 502, the image volume data can be retrieved by computers 506 and supplied to workstation 502 for conversion to a graphical image to be displayed to a user.

Figure 7:
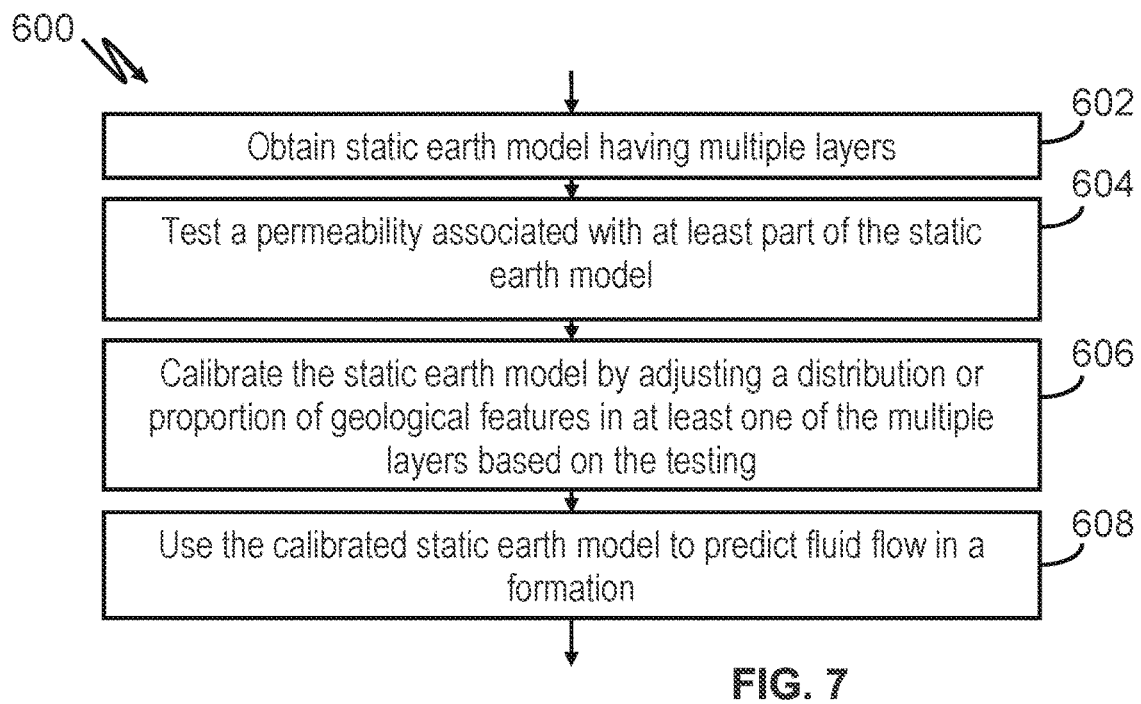
FIG. 7 shows an illustrative calibration method using formation permeability.

FIG. 7 shows an illustrative method 600. The method 600 may be performed, for example, by controller 120 of FIG. 2, computer system 202 of FIG. 3, computer system 45 of FIG. 4C, or computers 502 and/or 506 of FIG. 6. As shown, the method 600 includes obtaining a static earth model having multiple layers at block 602. In at least some embodiments, obtaining the model formation includes generating a lithotype proportion map, and determining facies volumes for the static earth model using the lithotype proportion map. In addition, obtaining the static earth formation may include determining geological (e.g., petrophysical) features for the static earth model that are spatially constrained based on the facies volumes. At block 604, a permeability associated with at least part of the static earth model is tested. For example, the permeability may be tested using Darcy's law ($K_{abs}=q\mu/A\nabla P$), where the values needed to compute $K_{abs}$ may be determined from collected or processed data (i.e., q, $\mu$, A, and $\nabla P$ can related to one or more well tests or production scenarios). At block 606, the static earth model is calibrated by adjusting the distribution or proportions of geological features (e.g., lithotype proportions, facies relationships, distribution of petrophysical properties within a defined depositional facies) in at least one of the multiple layers based on the permeability test results. Further, in some embodiments, calibrating the static earth model may include adding at least one additional layer to the static earth model based on the permeability test results. Additionally or alternatively, calibrating the static earth model may include removing at least one of the multiple layers in the static earth model based on the permeability test results. At block 608, the calibrated static earth model is used to predict fluid flow in a formation.

In at least some embodiments, the method 600 includes additional steps. For example, the method 600 may include repeating the steps of blocks 604 and 606 until fluid flow simulations results predicted using the static earth model and permeability results of a well test correlate to within a predetermined tolerance level.

Numerous other modifications, equivalents, and alternatives, will become apparent to those skilled in the art once the above disclosure is fully appreciated. For example, although at least some software embodiments have been described as including modules performing specific functions, other embodiments may include software modules that combine the functions of the modules described herein. Also, it is anticipated that as computer system performance increases, it may be possible in the future to implement the above-described software-based embodiments using much smaller hardware, making it possible to perform the described static earth model determination, calibration, and use operations using on-site systems (e.g., systems operated within a well-logging truck located at the reservoir). Additionally, although at least some elements of the embodiments of the present disclosure are described within the context of monitoring real-time data, systems that use previously recorded data (e.g., "data playback" systems) and/or simulated data (e.g., training simulators) are also within the scope of the disclosure. It is intended that the following claims be interpreted to embrace all such modifications, equivalents, and alternatives where applicable.

What is claimed is:

1. A method, comprising:
obtaining a static earth model having multiple layers;
testing a permeability of at least part of the static earth model;
calibrating the static earth model by adjusting a distribution or proportion of geological features in at least one of the multiple layers based on results of said testing; and
using the calibrated static earth model to predict fluid flow in a formation.

2. The method of claim 1, wherein said adjusting a distribution or proportion of geological features comprises adjusting at least one of lithotype proportions and facies relationships.

3. The method of claim 1, wherein said adjusting a distribution or proportion of geological features comprises adjusting a distribution of petrophysical properties within a defined depositional facies.

4. The method of claim 1, wherein testing the permeability is based on Darcy's law expressed as:

$$K_{abs} = \frac{q\mu}{A\nabla P},$$

where $K_{abs}$ is an absolute permeability, q is a flux, $\mu$ is a fluid viscosity, A is a cross-sectional area, and $\nabla P$ is a pressure gradient.

5. The method of claim 1, wherein testing the permeability comprises performing a fluid flow simulation using the static earth model and comparing results of the fluid flow simulation with results of a well test.

6. The method of claim 1, wherein said calibrating comprises applying a predetermined calibration rule.

7. The method of claim 1, wherein obtaining the static earth model comprises generating a lithotype proportion map, and determining facies volumes for the static earth model using the lithotype proportion map.

8. The method of claim 1, wherein obtaining the static earth model comprises determining petrophysical features for the static earth model that are spatially constrained based on facies volumes.

9. The method of claim 1, further comprising repeating said testing and said calibrating until fluid flow predicted using the static earth model and permeability results of a well test match to within a predetermined tolerance level.

10. A hydrocarbon production control system, comprising:
   a memory having a control program; and
   one or more processors coupled to the memory, wherein the control program, when executed, causes the one or more processors to:
      obtain a static earth model having multiple layers;
      test a permeability of at least part of the static earth model;
      calibrate the static earth model by adjusting facies features associated at least one of the multiple layers based on the computed permeability; and
      use the calibrated static earth model to predict fluid flow in a formation.

11. The system of claim 10, wherein the control program, when executed, causes the one or more processors to compute the permeability based on Darcy's law expressed as:

$$K_{abs} = \frac{q\mu}{A\nabla P},$$

where $K_{abs}$ is an absolute permeability, q is a flux, $\mu$ is a fluid viscosity, A is a cross-sectional area, and $\nabla P$ is a pressure gradient.

12. The system of claim 10, wherein the control program, when executed, causes the one or more processors to perform a fluid flow simulation and to compare results of the fluid flow simulation with the computed permeability.

13. The system of claim 12, wherein the control program, when executed, causes the one or more processors to adjust the facies features based on the comparison.

14. The system of claim 12, wherein the permeability is computed based on a well test analysis.

15. The system of claim 12, wherein the control program, when executed, causes the one or more processors to generate a facies model with facies feature proportions based on a lithotype proportion map, and to determine petrophysical features for the static earth model that are spatially constrained by the facies feature proportions.

16. The system of claim 10, wherein the control program, when executed, causes the one or more processors to repeat the compute, and calibrate steps are until fluid flow predicted using the static earth model and permeability results of a well test match to within a predetermined tolerance level.

17. A non-transitory computer-readable medium that stores software, wherein the software, when executed, causes a computer to:
   obtain a static earth model having facies features;
   perform a permeability test that compares fluid flow simulation results using the static earth model with a permeability computed by applying Darcy's law to an area between an injector well and a production well;
   calibrate the static earth model by adjusting the facies features based on the permeability test; and
   use the calibrated static earth model to predict fluid flow in a formation.

18. The non-transitory computer-readable medium of claim 17, wherein the software, when executed, causes the computer to generate a facies model, to determine a spatial distribution of the facies features using a lithotype proportion map, and to determine petrophysical features for the static earth model that are spatially constrained by the facies features.

19. The non-transitory computer-readable medium of claim 17, wherein the software, when executed, causes the computer to calibrate the static earth model based on a predetermined calibration rule.

20. The non-transitory computer-readable medium of claim 17, wherein the software, when executed, causes the computer to calibrate the static earth model using a calibration interface that accepts user input.

* * * * *